Figure 1:
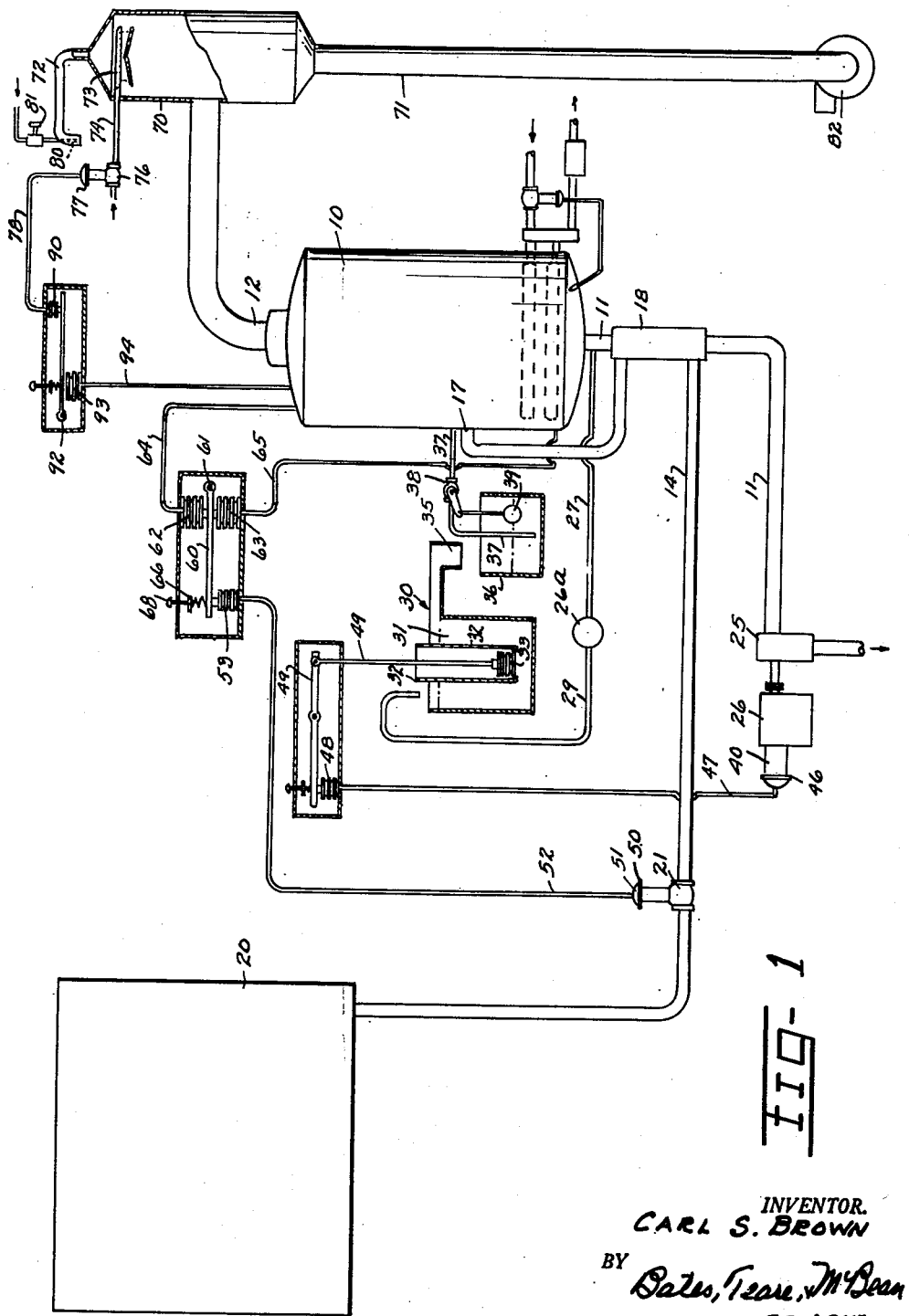

May 27, 1952  C. S. BROWN  2,598,345
SYSTEM FOR CONCENTRATING LIQUIDS
Filed Nov. 3, 1950

INVENTOR.
CARL S. BROWN
BY Bates, Teare, McBean
ATTORNEYS

Patented May 27, 1952

2,598,345

UNITED STATES PATENT OFFICE 2,598,345

SYSTEM FOR CONCENTRATING LIQUIDS

Carl S. Brown, Lakewood, Ohio, assignor to Glascote Products, Inc., Cleveland, Ohio, a corporation of Ohio Application November 3, 1950, Serial No. 193,934

2 Claims. (Cl. 159—44)

This invention relates to a system for concentrating liquids, such as milk and the like, and more particularly to a system for condensing milk and the like, which system will be continuous and automatic in operation, and which will require a minimum amount of attention by the operator. These, therefore, are the general objects of the invention.

More particularly, the invention is concerned with the provision of an improved system of concentrating liquids, such as milk and the like, utilizing a conventional type vacuum pan, and an improved control system therefor, resulting in a continuous concentrating or condensing of the liquid without requiring manual operation of the controls after the system has been placed in operation and wherein the density of the concentrated liquid will be maintained at a constant predetermined value.

According to the present system, the liquid to be concentrated is supplied to a vacuum pan, which may be of the conventional type comprising a substantially enclosed liquid container provided with a heating unit to heat the liquid in the container to concentrate the same, the container being provided with a discharge conduit at its bottom to permit the withdrawal of liquid therefrom, together with a second discharge conduit adjacent its top which connects the container with a condenser to permit the discharge of vapors and gases resulting from the concentrating action and to maintain a vacuum in the container. The flow of liquid to the container is automatically governed in response to the differential between the pressures at top and bottom of the container, thereby automatically maintaining a substantially predetermined liquid level in the container. The operation of the condenser is automatically controlled in response to the absolute pressure at the top of the container, thereby automatically maintaining a substantially predetermined vacuum in the container. The rate of flow of concentrated liquid from the discharge at the bottom of the container is automatically governed by the density of the liquid in a sampling flow which is continuously removed from the discharge at the bottom of the container, and returned to the container, thereby automatically insuring a constant predetermined density of the concentrated liquid.

In the drawings, the figure is a diagrammatic illustration of the improved system for concentrating liquids, such as milk and the like.

As heretofore mentioned, improved system for concentrated liquids utilizes a vacuum pan which may be of a more or less conventional type. One such vacuum pan is illustrated as comprising a substantially enclosed vertical tank or container 10 having a discharge conduit 11 at its bottom to permit the discharge or withdrawal of the concentrated liquid from the container. The container also is provided with a second discharge conduit 12 in communication with its upper end for discharging vapors and gases from the top of the pan. The discharge conduit 12 extends inwardly into the pan and is provided with a shield 16 to prevent the passage of fluid from the top of the pan.

Intermediate its ends the container is provided with an inlet 17 which is shown as comprising a conduit fitted into the wall of the pan in a tangential direction to give the incoming liquid a helical motion and decrease its velocity as it enters the container or pan. A suitable heat transfer unit, such as a plurality of spaced heating coils 15, are mounted in the lower portion of the container to heat and concentrate the liquid therein.

In the embodiment illustrated the intake conduit 17 connects with a manifold 18 which encircles the discharge pipe 11 and which is connected with a liquid supply 20 by a conduit 14. A suitable valve 21 is interposed in the conduit to control the flow of liquid to the container as will be hereinafter described. This arrangement utilizes the heat in the discharged liquid to preheat the liquid to be concentrated before it enters the pan 10.

The discharge conduit 11 is connected with a pump 25 operated by a motor 26, the speed of which is controlled in accord with the density of the liquid in the discharge conduit 11. However, if desired, a constant speed motor may be used together with a pump of the type which may be readily controlled to vary its rate of discharge. Either arrangement of pump and motor is well known and hence will not be described in detail.

The density, or specific gravity of the concentrated liquid is determined by a density controller generally indicated at 30. This controller is subjected to a continuous sampling flow of the concentrated liquid. The sampling flow is provided by a continuously acting pump 26a, the inlet to which is connected by a conduit 27 with the discharge conduit 11 at a point adjacent the vacuum pan. The discharge of the pump 26a is connected with the density controller 30 by a conduit 29.

The density controller 30 may comprise an open well 31 into the top of which the sampling liquid is discharged by the pump 26a. The well 31 is provided with a pair of spaced vertically extending partitions which project from the top of the well to a point adjacent to but spaced above the bottom thereof. The lower ends of these partitions are connected by a flexible diaphragm 33. The liquid in the well 31 is retained at a constant level by an overflow such as the tube 35 which leads from the well 31 to a second well 36. The arrangement is such that the liquid flowing through the well 31 acts on the diaphragm 33 moving it up and down in response to the density of such liquid.

The liquid flowing to the well 36 is returned to the tank 10. A conduit 37 is connected with the container 10 and extends into the well 36 with its lower open end adjacent to but spaced above the bottom of the well. A suitable valve 38 is interposed in the conduit 37 and is controlled by a float 39 which coacts with the liquid in the well 36. When the liquid in the well 36 rises above a predetermined level, the float 39 opens the valve 38, whereupon the vacuum in the pan or container 10 draws liquid from the well 36 into the container 10 until the position of the float 39 closes the valve 38.

The rate of flow of the liquid past the diaphragm 33 is comparatively slow, hence, for practical purposes, the diaphragm is responsive to the specific gravity of the liquid in the well and is unaffected by the flow of such liquid. The diaphragm is connected to control the effective operation of the pump 25. The pump 25 or the motor 26, or the driving connections between the pump and motor, is controlled in the usual manner by a pressure responsive member 40.

As indicated in the drawings, the motor 26 is controlled by a speed controller 40 of the usual type. This controller is connected with the motor 26 and is operated by a diaphragm indicated at 46. The diaphragm 46 is responsive to the pressure of fluid in a closed system, including a conduit 47 connecting the diaphragm with the interior of an expansible bellows 48. The bellows 48 is mechanically actuated by linkage 49 connecting it with the diaphragm 33 of the density controller 30. The diaphragm 46 may be connected to actuate an electric controller in the usual manner to thereby control the speed of the motor and thus the pump output. Other types of control may be provided so long as the control is such that the pump output will be varied in response to the movement of the diaphragm 33 under the influence of the density of the liquid in the well 30.

The valve 21, heretofore mentioned, controls the admission of liquid to be concentrated into the vacuum pan. This valve is of a type which is normally closed. The valve is actuated by a flexible diaphragm 50 which is responsive to the fluid pressure in a closed system including a pressure chamber 51 above the diaphragm 50 which is connected by a conduit 52 with an expansible bellows 53. The bellows 53 is actuated by an arm 60 pivoted as at 61 to a stationary pivot and which extends across the bellows 53. The arm 60 passes between and is moved in response to a pair of opposing pressure responsive expansible bellows 62 and 63. One of these bellows is connected by piping 64 with the upper end of the vacuum pan or container 10, and the other is connected by a conduit 65 with the lower end of the vacuum pan 10. Accordingly, it will be seen that the valve 21 is opened and closed in response to the differential in pressure between the upper and lower ends of the vacuum pan 10. The arm 60 is pretensioned by a spring 66, the tension of which is controlled by an adjusting screw 68 whereby any desired predetermined level of liquid may be maintained in the vacuum pan. A similar pretensioning and adjusting device may be used in connection with the bellows 48 heretofore described.

The discharge vapors and gases from the pan 10 pass through the discharge conduit 12 into a condenser 70. As illustrated, this condenser comprises a cylindrical member provided at its lower end with a discharge conduit or stand pipe 71 and, at its upper end, with a discharge conduit 72. A cooling spray device 73 is mounted in the upper portion of the condenser 70, and is connected with a supply of cooling fluid, preferably water, by a conduit 74. The flow of the cooling fluid is controlled by a valve 76 interposed in the line 74. This valve is opened and closed in response to the pressure in the top of the vacuum pan 10 by a closed fluid pressure system. For this purpose the valve 76 is provided with the usual diaphragm chamber indicated at 77 which is connected with an expansible bellows 90 which actuates an arm 91 pivoted to a stationary pivot 92. This arm is actuated by an expansible pressure responsive bellows or diaphragm 93 which is connected with the top of the pan by a conduit 94. A pretensioning and adjusting device similar to that described in connection with the bellows 53 and arm 60 may be used to control the adjustment of the bellows 92 and arm 91.

The entrainment air and non-condensible gases are discharged from the condenser through the conduit 72 by a steam jet, generally indicated at 80. This jet is controlled by a suitable manually operated valve 81. The waste liquids and water are discharged from the conduit 71 either by the usual barometric column or by means of a constantly acting pump generally indicated at 72. The action of the pump 82 and the steam jet 80 assist in maintaining a vacuum on the pan. However, the amount of this vacuum is controlled by the rate of condensation of the gases in the condenser which is controlled by the amount of cooling fluid supplied through the conduit 74. As this fluid flow is responsive to the pressure in the top of the vacuum pan a predetermined vacuum will be automatically maintained in the pan 10 at all times.

From the foregoing, it will be seen that the present invention provides a system in which a predetermined vacuum is maintained in the pan 10 by automatically controlling the flow of the cooling medium to the condenser in response to the pressure at the top of the pan, while the rate of supply of liquid to be condensed to the pan is automatically controlled to maintain a predetermined level in the pan at all times, and that the discharge of concentrated liquid is controlled by the density of the liquid itself in response to the density of a continuously acting flow of liquid in a by-pass extending from the bottom of the pan back into the pan, thus insuring a continuous automatic condensing or concentrating operation as well as the production of a concentrated liquid having a predetermined density. Likewise, the present invention permits the use of comparatively small vacuum pans and at the same time insures consistency of the product.

I claim:

1. In an apparatus for continuously condensing liquids having a vacuum pan provided with means for heating the liquid contents of the pan, a liquid outlet at the bottom of the pan, a liquid inlet intermediate the ends of the pan and means for developing a predetermined pressure in the pan including a condenser communicating with the top of the pan, combination of a discharge conduit connected with the pan outlet, a liquid withdrawing means including a pump connected with said conduit to withdrawing fluid from the pan at a variable rate of flow, means responsive to the density of liquid flowing through the discharge conduits to control the rate of flow induced by the withdrawing means, said last-named means including a continuously operating pump having an inlet and an outlet, a conduit connecting said inlet with said discharge conduit intermediate the pan and the withdrawing means, means responsive to density of the flow of liquid induced by said pump to control the withdrawing means, an open top and receptacle to receive the liquid from the pump outlet, a conduit extending from the receptacle to the pan, a valve in said conduit, a float controlled means operatively connected to open said valves when the level of liquid in the receptacle rises above a predetermined point whereby such liquid will return to the pan, a liquid storage tank, a supply conduit extending between the storage tank and the pan inlet, said tank and conduit being positioned to cause liquid to flow therefrom into the pan under the influence of gravity, a pair of pressure responsive devices, a conduit extending from one of said devices to the top of the pan, a conduit extending from the other of said devices to the bottom of the pan, and means responsive to both of said devices to control the flow of liquid through the supply conduit.

2. In an apparatus for continuously condensing liquids having a vacuum pan provided with means for heating the liquid contents of the pan, a liquid outlet at the bottom of the pan, a liquid inlet intermediate the ends of the pan and means for developing a predetermined pressure in the pan including a condenser communicating with the top of the pan, and means for supplying liquid to the pan to maintain a substantially constant liquid level thereon, the combination of a discharge conduit connected with the pan outlet, a liquid withdrawing means including a pump connected with said conduit to withdrawing fluid from the pan through the conduit at a variable rate of flow, means responsive to the density of fluid in the discharge conduit to control said rate of flow, said last-named means including a continuously operating pump having an inlet and an outlet, a conduit connecting said inlet with said discharge conduit intermediate the pan, an open topped receptacle, a conduit extending from the pump outlet to a point above the receptacle and discharging into the receptacle, said receptacle having an overflow to maintain a predetermined liquid level in the receptacle, means extending into the liquid in the pan and responsive to the density of such fluid to control the withdrawing means, a container into which the overflow from the receptacle empties, a conduit extending from a point adjacent the bottom of said container into the pan, a valve in said conduit to control the flow of liquid therethrough and a float coacting with the liquid in the container and operatively connected with said valve to control the valve in accord with the rise and fall of the liquid in the container.

CARL S. BROWN.

REFERENCES CITED

The following references are of record in the file of this patent:

UNITED STATES PATENTS

| Number | Name | Date |
|---|---|---|
| 559,857 | Lillie | May 12, 1896 |
| 1,196,020 | Pattno et al. | Aug. 29, 1916 |
| 1,849,252 | Shield | Mar. 15, 1932 |
| 1,932,228 | Postel | Oct. 24, 1933 |
| 2,315,683 | Ziegler | Apr. 6, 1943 |
| 2,519,608 | Stilson | Aug. 22, 1950 |